United States Patent
Kim et al.

(10) Patent No.: US 7,627,050 B2
(45) Date of Patent: Dec. 1, 2009

(54) ADAPTIVE TRANSMITTING AND RECEIVING DEVICE AND METHOD IN WIRELESS COMMUNICATION SYSTEM USING FREQUENCY DIVISION DUPLEXING

(75) Inventors: Kwang-Soon Kim, Daejeon (KR); Yun-Hee Kim, Daejeon (KR); Jae-Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 682 days.

(21) Appl. No.: 10/848,921

(22) Filed: May 19, 2004

(65) Prior Publication Data

US 2005/0135497 A1 Jun. 23, 2005

(30) Foreign Application Priority Data

Dec. 22, 2003 (KR) .................... 10-2003-0094824

(51) Int. Cl.
H04B 7/02 (2006.01)
(52) U.S. Cl. .................. 375/267; 375/259; 375/260; 455/132; 455/135
(58) Field of Classification Search ............. 375/267, 375/260, 259
See application file for complete search history.

(56) References Cited

U.S. PATENT DOCUMENTS

| | | | |
|---|---|---|---|
| 6,473,467 B1 | 10/2002 | Wallace et al. | |
| 6,553,534 B2 | 4/2003 | Yonge, III et al. | |
| 6,584,161 B2 * | 6/2003 | Hottinen et al. | 375/299 |
| 6,594,473 B1 * | 7/2003 | Dabak et al. | 455/101 |
| 6,785,341 B2 * | 8/2004 | Walton et al. | 375/267 |
| 6,791,954 B1 * | 9/2004 | Cheng et al. | 370/311 |
| 7,155,177 B2 * | 12/2006 | Jootar et al. | 455/101 |
| 7,200,368 B1 * | 4/2007 | Hottinen et al. | 455/101 |
| 7,224,943 B2 * | 5/2007 | Hamalainen et al. | 455/69 |
| 7,242,727 B2 * | 7/2007 | Liu et al. | 375/295 |
| 7,260,153 B2 * | 8/2007 | Nissani | 375/259 |

(Continued)

FOREIGN PATENT DOCUMENTS

KR 1020030020158 3/2003

(Continued)

OTHER PUBLICATIONS

"Adaptive Modulation Techniques for Duplex OFDM Transmission", T. Keller, et al., IEEE Transactions on Vehicular Technology, vol. 49, No. 5, Sep. 2000, pp. 1893-1906.

(Continued)

Primary Examiner—Shuwang Liu
Assistant Examiner—Kenneth Lam
(74) Attorney, Agent, or Firm—Blakely, Sokoloff, Taylor & Zafman LLP

(57) ABSTRACT

Disclosed is an adaptive transmitting and receiving device and method using frequency division duplexing. A transmitter transmits a preamble or a pilot to a receiver. The receiver estimates a received SNR from the preamble or pilot, determines parameters (received log likelihood ratio parameters) of determining the distribution of the received log likelihood ratio, and feeds them back to the transmitter. The transmitter adaptively determines an antenna method, a modulation method, and a transmit power according to the parameters, and adaptively transmits traffic data to the receiver according to the determined antenna method, the modulation method, and the transmit power.

14 Claims, 9 Drawing Sheets

U.S. PATENT DOCUMENTS

| | | | |
|---|---|---|---|
| 2002/0110138 A1* | 8/2002 | Schramm | 370/430 |
| 2003/0095508 A1* | 5/2003 | Kadous et al. | 370/252 |
| 2003/0109225 A1* | 6/2003 | Aldajani et al. | 455/69 |
| 2003/0125040 A1* | 7/2003 | Walton et al. | 455/454 |
| 2003/0128674 A1* | 7/2003 | Kong et al. | 370/320 |
| 2003/0198279 A1* | 10/2003 | Zeira et al. | 375/130 |
| 2004/0120411 A1* | 6/2004 | Walton et al. | 375/260 |
| 2004/0252632 A1* | 12/2004 | Bourdoux et al. | 370/210 |

FOREIGN PATENT DOCUMENTS

WO    WO 02-49305    6/2002

OTHER PUBLICATIONS

"A blockwise loading algorithm for the adaptive modulation technique in OFDM systems", Rainer Grünheid et al., VTC 2001 Fall, IEEE VTS 54th, vol. 2. pp. 948-951.

* cited by examiner (a)

(b)

(c)

(d)

4-QAM    16-QAM

Diversity Rx log likelihood ratio
distribution parameter determining unit
(630)

Spatial multiplexing Rx log likelihood
ratio distribution parameter determining unit
(640)

US 7,627,050 B2

ADAPTIVE TRANSMITTING AND RECEIVING DEVICE AND METHOD IN WIRELESS COMMUNICATION SYSTEM USING FREQUENCY DIVISION DUPLEXING

CROSS REFERENCE TO RELATED APPLICATION

This application claims priority to and the benefit of Korea Patent Application No. 2003-94824 filed on Dec. 22, 2003 in the Korean Intellectual Property Office, the content of which is incorporated herein by reference.

BACKGROUND OF THE INVENTION (a) Field of the Invention

The present invention relates to an adaptive transmission method in a wireless communication system using frequency division duplexing. More specifically, the present invention relates to an adaptive transmitting and receiving device and method in a wireless communication system using frequency division duplexing for feeding back a small amount of information to effectively perform adaptive transmission in an environment using at least one transmit antenna and at least one receive antenna.

(b) Description of the Related Art

As shown in FIG. 1, an encoder and modulator 180 of a transmitter 100 transmits pilots or preambles 130 to a receiver 110 through a wireless channel 120, and the receiver 110 uses a demodulator and decoder 140 to demodulate them, measures a (per-carrier) SNR (signal to noise ratio) 160 through an SNR measuring device 150, and feeds this information back to the transmitter 100 in the wireless communication system using conventional frequency division duplexing. The transmitter 100 adaptively applies a modulation method, an encoding method, and power allocation through a modulation and encoding method determining unit 170 based on the SNR 160 fed back from the receiver 110 to allow the encoder and modulator 180 to adaptively transmit traffic data 190, thereby enhancing performance of the wireless communication system and increasing its capacity.

Differing from a single carrier system, it is difficult to apply the conventional method to the actual system due to the large amount of feedback information excluding the case of very slow changes in channels, because the channel gains of respective carriers are different in frequency selective fading channels in the case of a multi-carrier system. In particular, since a cellular system which uses frequency division duplexing supports fast mobile speed and has a lot of carriers, the amount of feedback information becomes very large, and hence, it is impossible to use the conventional method.

As shown in FIG. 2, therefore, a method for combining adjacent carriers into a predetermined number to use them as carrier groups 200, finding mean SNR 220 or lowest SNR 230 of the carrier groups from the actual SNR 210, and feeding them back is disclosed (refer to "Adaptive modulation techniques for duplex OFDM transmission," by T. Keller and L. Hanzo, IEEE Trans. Vehicular Technology, vol. 49, no. 5, September, 2000; and "A blockwise loading algorithm for the adaptive modulation technique in OFDM systems," by R. Grunheid, E. Bolinth, and H. Rohling, VTC 2001 Fall, IEEE VTS 54$^{th}$, Vol. 2, pp. 948-951.)

Feedback information can be reduced by the number of carriers in the carrier groups in this case, but when the number of carriers in the carrier group is increased in the frequency selective fading channel, the channel gains are changed in a single carrier group to degrade the system performance, and when the number of carriers in the carrier group is decreased, the amount of feedback information is still large, and accordingly, it is not useful for the system that supports fast mobile speed.

SUMMARY OF THE INVENTION

It is an advantage of the present invention to provide an adaptive transmitting and receiving device and method in a wireless communication system using frequency division duplexing for allowing effective adaptive transmission with a much lesser amount of feedback information by using information that determines the received likelihood ratio distribution, which determines receiving performance, as the feedback information, thereby improving performance of the wireless communication system and increasing its capacity.

It is another advantage of the present invention to provide an adaptive transmitting and receiving device and method in a wireless communication system using frequency division duplexing for performing adaptive transmission by only using constant feedback information irrespective of a number of transmit and receive antennas in the case of using transmit and receive diversity, and for adaptively using a method for using a single transmit antenna, a method for using transmit diversity by using a plurality of transmit antennas, and a method for using a spatial multiplexing mode, with a small amount of additional information in the case of using spatial multiplexing together with it.

In one aspect of the present invention, an adaptive transmitter in a wireless communication system using frequency division duplexing comprises: a modulation and encoding method and transmit power determining unit for determining an antenna method, a modulation and encoding method, and a corresponding transmit power according to the parameter (a received log likelihood ratio parameter), which determines a distribution of the received log likelihood ratio, fed back from a receiver; and an encoder and modulator for adaptively transmitting the traffic data to the receiver according to the antenna method, the modulation and encoding method, and the transmit power determined by the modulation and encoding method and transmit power determining unit.

The modulation and encoding method and transmit power determining unit comprises: a per-modulation-encoding-method target mean received SNR (signal to noise ratio) table for predefining target mean received SNR per modulation encoding method; a transmit power increase table for establishing per-modulation-encoding-method compensated power values that correspond to the received log likelihood ratio parameter fed back from the receiver; a transmit power determining unit for using the compensated power value output from the per-modulation-encoding-method target mean received SNR table and the compensated power value output from the transmit power increase table according to the received log likelihood ratio parameter value and determining compensated power values of the corresponding antenna method, the modulation method, and the encoding method; and an antenna/modulation/encoding method determining unit for determining the antenna method and the modulation and encoding method corresponding to the compensated power values determined by the transmit power determining unit, and outputting them to the encoder and modulator.

The received log likelihood ratio parameter includes a mean and a normalized standard deviation of the SNRs calculated by the receiver.

The received log likelihood ratio parameter includes a mean and a normalized standard deviation of the combined SNRs calculated by the receiver in the case of using diversity transmission, the parameter includes a mean and a normalized standard deviation of the spatial channel SNRs calculated by the receiver in the case of using spatial multiplexing transmission, and the parameter includes a mean and a normalized standard deviation of the combined SNRs calculated by the receiver, and a mean and a normalized standard deviation of the spatial channel SNRs calculated by the receiver in the case of using both diversity transmission and spatial multiplexing transmission.

In another aspect of the present invention, an adaptive receiver in a wireless communication system using frequency division duplexing comprises: a demodulator and decoder for receiving signals from a transmitter, and demodulating and decoding the signals; an SNR measuring unit for estimating channel gains or SNRs in a single code block through a preamble or a pilot output by the demodulator and decoder; and a received log likelihood ratio parameter determining unit for finding a parameter for determining a distribution of the received log likelihood ratio in a single code block from the channel gains or the SNRs estimated by the SNR measuring unit, and feeding the parameter back for adaptive transmission of the transmitter.

The received log likelihood ratio parameter determining unit comprises: a diversity received log likelihood ratio parameter determining unit for calculating combined SNRs from the channel gains or the SNRs estimated by the SNR measuring unit, determining a diversity received log likelihood ratio parameter, and outputting the parameter to the transmitter; and a spatial multiplexing received log likelihood ratio parameter determining unit for calculating SNRs of spatial channels from the channel gains or the SNRs estimated by the SNR measuring unit, determining a spatial multiplexing received log likelihood ratio parameter, and outputting the parameter to the transmitter.

The diversity received log likelihood ratio parameter determining unit comprises: a combined channel gain calculator for receiving per-transmit/receive-antenna channel gain or SNR for each symbol in a single code block from the SNR measuring unit, and finding a combined channel gain and a combined SNR of each symbol in the code block; and a mean and normalized standard deviation calculator for finding a mean and a normalized standard deviation of the combined SNRs in the single code block obtained from the combined channel gain calculator, setting them as the diversity received log likelihood ratio parameters, and feeding the parameters back to the transmitter.

The spatial multiplexing received log likelihood ratio parameter determining unit comprises: a spatial channel gain calculator for receiving a channel gain matrix of each symbol in the single code block from the SNR measuring unit, and finding singular values of the matrix or the SNR of the respective spatial channels; and a mean and normalized standard deviation calculator for finding a mean and a normalized standard deviation of the spatial channel gains or the spatial channel SNRs in the single code block found from the spatial channel gain calculator, setting them as the spatial multiplexing received log likelihood ratio parameters, and feeding the parameters back to the transmitter.

In still another aspect of the present invention, an adaptive transmitting method of a wireless communication system using frequency division duplexing, comprises: (a) transmitting a pilot or a preamble to a receiver by using a predefined transmit power; (b) determining an antenna method, a modulation and encoding method, and a transmit power based on the parameter (the received log likelihood ratio parameter) for determining the distribution of the received log likelihood ratio determined from the transmitted pilot or the preamble and fed back from the receiver; and (c) transmitting traffic data to the receiver by using the determined antenna method, the modulation and encoding method, and the transmit power.

The step (b) comprises presetting and storing the performance of all the antenna/modulation/encoding methods used by an adaptive transmitter with respect to the pre-determined quantized values of the received log likelihood ratio parameter, and calculating transmit power needed for obtaining target performance on the respective antenna/modulation/encoding methods from the received log likelihood ratio parameter fed back from the receiver.

The step (b) comprises: compensating for a difference between the mean received SNR for achieving target performance on the predefined antenna methods and the modulation and encoding methods and the mean received SNR fed back from the receiver; and finding a transmit power so as to compensate for a compensated transmit power further needed for achieving target performance on the predefined antenna methods and the modulation and encoding methods from the normalized standard deviation of the fed-back SNR.

In a further aspect of the present invention, an adaptive receiving method of a wireless communication system using frequency division duplexing, comprises: (a) estimating a complex channel gain (the complex channel gain being from a transmit antenna to a receive antenna) of each symbol in a single code block through a pilot or a preamble transmitted from a transmitter; (b) calculating the parameter (the received log likelihood ratio parameter) for determining the distribution of the received log likelihood ratio from the estimated complex channel gain (of from a transmit antenna to a receive antenna) of each symbol in a single code block; and (c) feeding the calculated received log likelihood ratio parameter to the transmitter for adaptive transmission in the transmitter.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
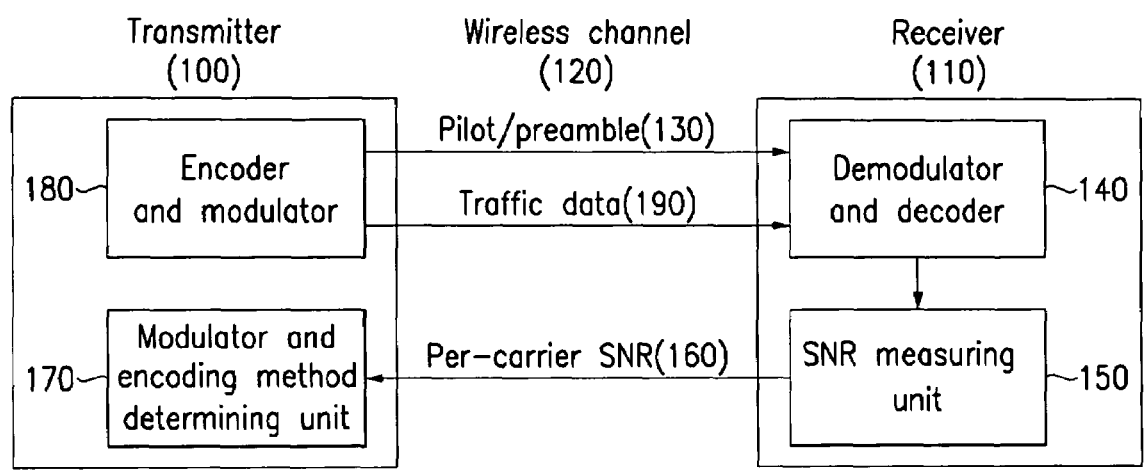
FIG. 1 shows a brief diagram of a conventional adaptive transmitting and receiving device in a wireless communication system using frequency division duplexing.
Figure 2:
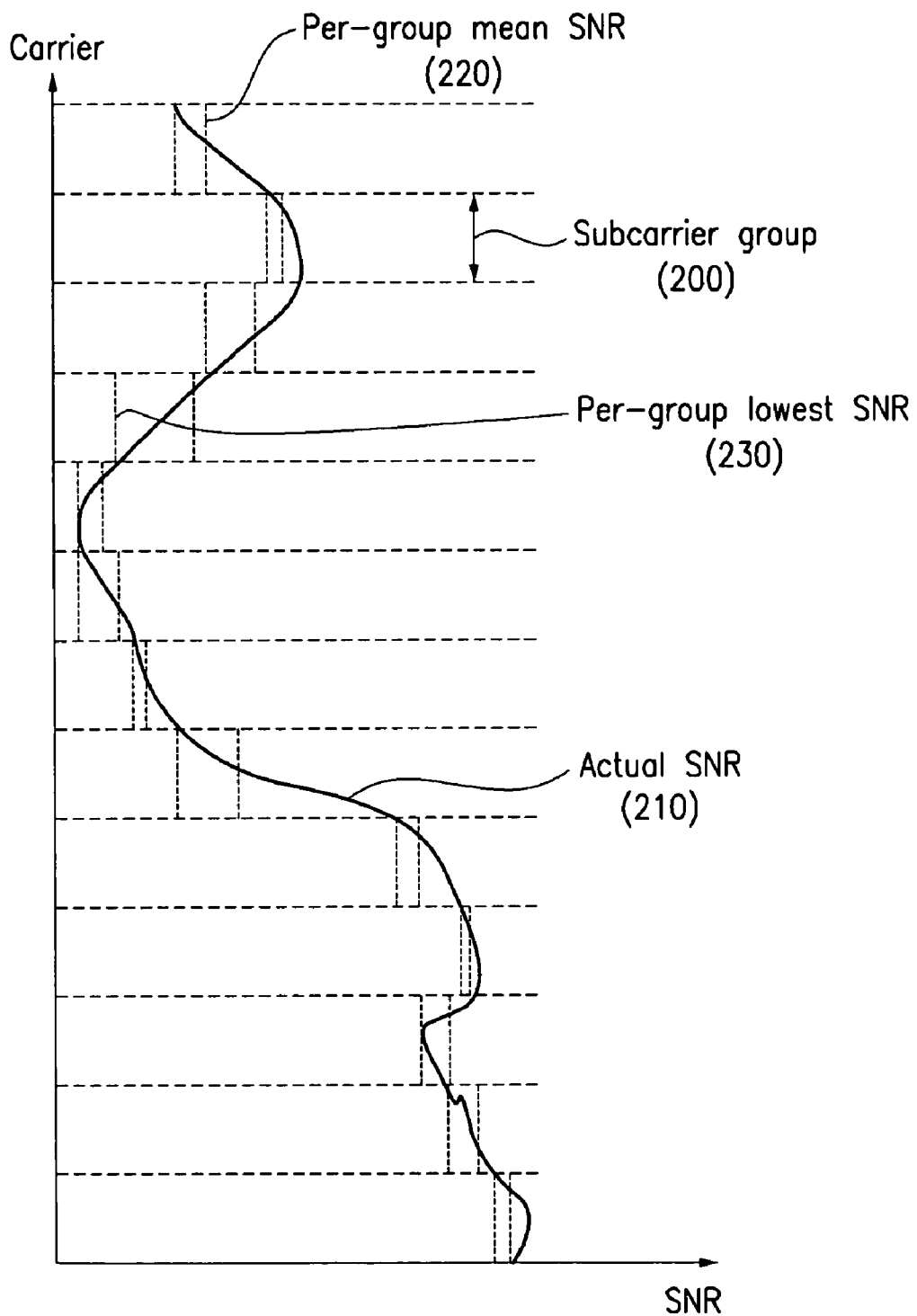
FIG. 2 shows an exemplified channel characteristic per carrier in a wireless communication system using multi-carriers, and a brief diagram of a conventional adaptive transmitting and receiving method used for reducing an amount of feedback information.
Figure 3:
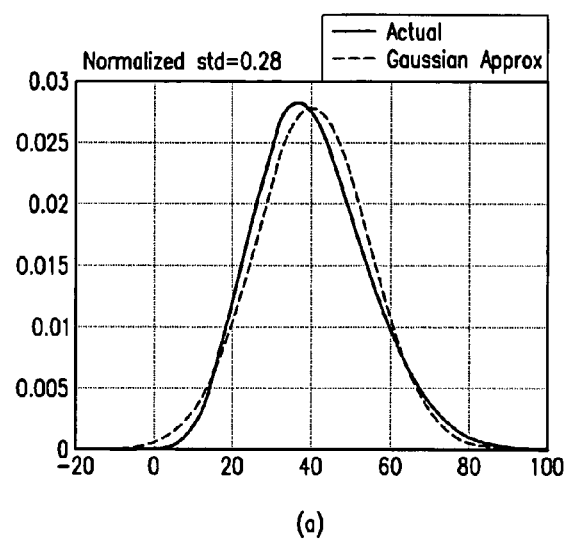
FIG. 3 shows an exemplified distribution of received log likelihood ratios in the wireless communication system using general multi-carriers, showing that the normalized standard deviation value is 0.28 in (a), 0.48 in (b), 0.77 in (c), and 0.82 in (d)
Figure 3:
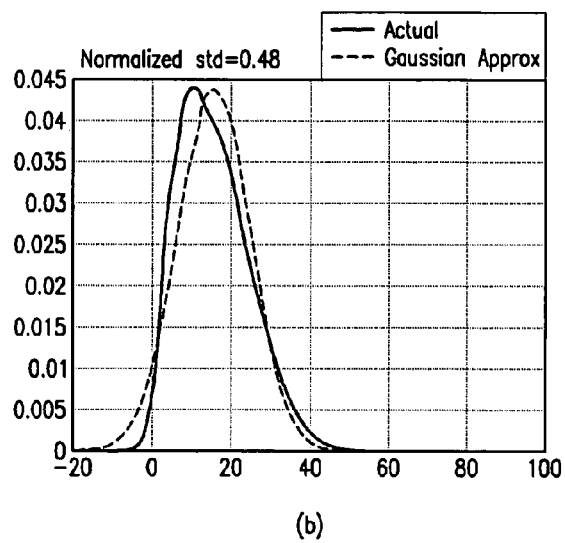
Figure 3:
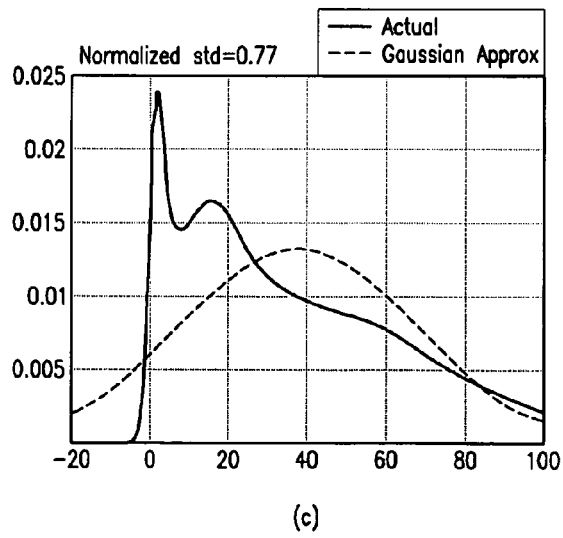
Figure 3:
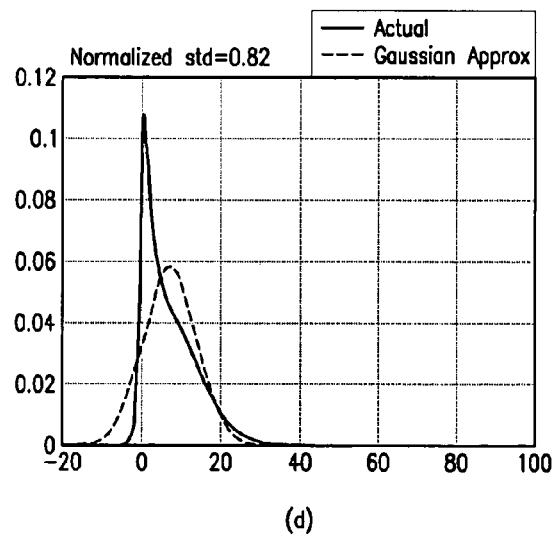

FIG. 3 shows an exemplified distribution of received log likelihood ratios in the wireless communication system using general multi-carriers, showing that the normalized standard deviation value is 0.28 in (a), 0.48 in (b), 0.77 in (c), and 0.82 in (d).

Referring to FIG. 3, distributions of the received log likelihood ratios and distributions approximated with the Gaussian distribution are illustrated when a channel power profile and a delay profile are respectively (0 dB, −1 dB, −9 dB, −10 dB, −15 dB, −20 dB) and (0 310 ns 710 ns 1090 ns 1730 ns 2510 ns) in an OFDM system using 2,048 subcarriers in the band of 20 MHz.

As shown in FIGS. 3(a) and 3(b), when the normalized standard deviation values (normalized std) are small (e.g., 0.28 and 0.48), they correspond well to the distribution approximated with the Gaussian distribution. In this case, the mean value and the standard deviation value for determining the Gaussian distribution are fed back to the transmitter to predict receiving performance of the receiver.

When the normalized standard deviation values are large (e.g., 0.77 and 0.82), as shown in FIGS. 3(c) and 3(d), they frequently fail to correspond to the Gaussian approximated distribution, and the pattern of the distribution of the received log likelihood ratio is various. Therefore, when the value of the normalized standard deviation is large, a large number of parameters is needed so as to accurately represent the distribution of the received log likelihood ratio, and the amount of feedback information required for transmitting the parameters to the transmitter is increased.

Therefore, in order to reduce the amount of the feedback information, the same amount of feedback information is fed back to the transmitter regardless of the value of the normalized standard deviation. In this case, it is needed to put a margin to the transmit power since receiving performance cannot be accurately predicted when the value of the normalized standard deviation is large. The margin is not set to be large when an encoding rate of codes is low, and the margin becomes large when the encoding rate is high, but since the transmitter knows that the standard deviation of the received log likelihood ratio is large, the transmitter increases a modulation degree and selects a modulation method of a low encoding rate when transmitting the same or similar amount of information, thereby avoiding spending unnecessary transmit power.

Also, when using transmit and receive diversity by using a plurality of transmit antennas and receive antennas, the normalized standard deviation of the received log likelihood ratio becomes less because of effects of diversity, and hence, the Gaussian approximation works well for most cases.

Figure 4:
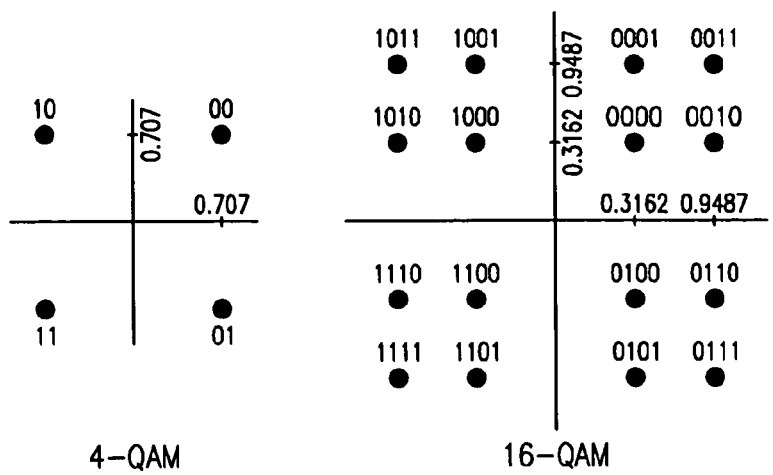
FIG. 4 shows constellation diagrams for using 4-QAM and 16 QAM following a gray encoding method, and an exemplified case of using at least one antenna for each transmitter and receiver and allocating subchannels well spread in both time- and frequency-domains to receivers.
Figure 4:
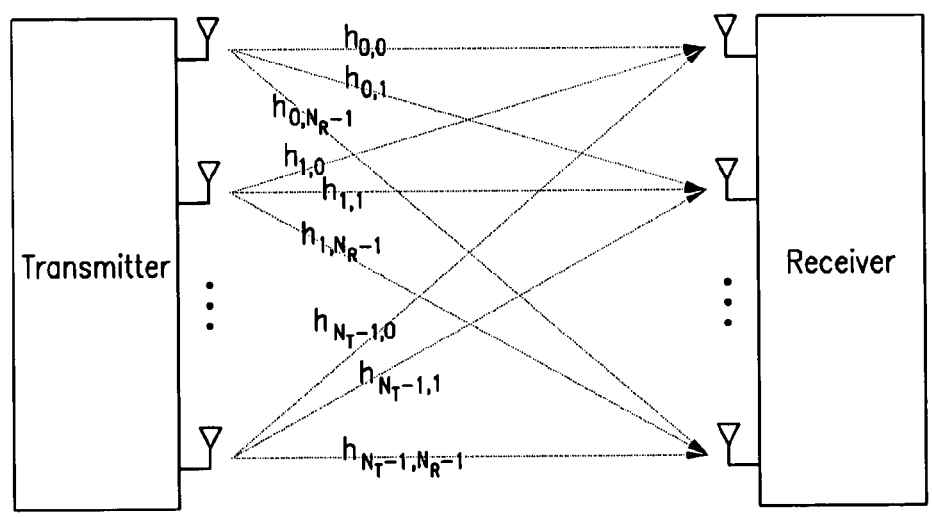
Figure 4:
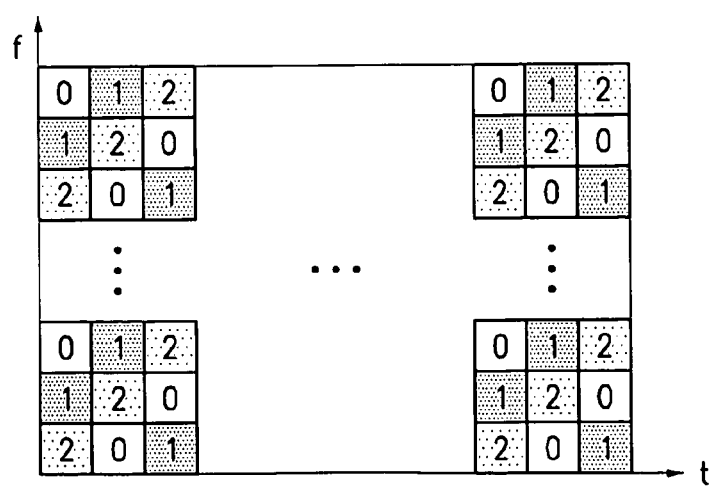

FIG. 4 shows constellation diagrams for using 4-QAM and 16 QAM following a gray encoding method, and an exemplified case of using at least one antenna for each transmitter and receiver and allocating subchannels well spread in both time- and frequency-domains to receivers.

As shown, constellation diagrams in the case of M=4 and M=16 when using the modulation method of M-QAM ($M=2^{2n}$) following the gray encoding method are illustrated, a wireless channel environment in the case of using at least one antenna at the transmitter and the receiver is depicted, and an arrangement diagram of the subchannels well spread in both time- and frequency-domains in the case of transmitting signals to a plurality of receivers from a single transmitter.

Since the respective subchannels are well spread in both time- and frequency-domains, channel characteristics of all the subchannels correspond to each other in the viewpoint of a single receiver, and hence, the overall channel information is transmitted to the transmitter irrespective of specific subchannels.

First, the case in which a number $N_T$ of transmit antennas and a number $N_R$ of receive antennas are respectively one is considered. In this case, $h_{0,0}$ is replaced with a simpler form h. One symbol is generated for each log 2(M) bits in the case of M-QAM. The case of 4-QAM is initially considered. Respective bits have the same received log likelihood ratio since a single symbol is generated with two bits, and their Euclidean distances correspond to each other in the constellation. When defining that x is a transmit symbol with a normalized mean energy of 1, $x^k$ is the $k^{th}$ bit for determining the transmit symbol, y is a received symbol, h is a complex channel gain, and $z=z_i+jz_q$ is a channel-compensated symbol at the receiver, and the log likelihood ratio at the receiver is given as Equation 1.

$$y = hx + n \quad \text{Equation 1}$$
$$z = h^* y / |h| = |h|x + n'$$
$$\Lambda(x^0) = \log\left(\sum_{x \in X^{0,0}} Pr\{z \mid |h|x\} Pr\{x\}\right) -$$
$$\log\left(\sum_{x \in X^{0,1}} Pr\{z \mid |h|x\} Pr\{x\}\right)$$
$$= \frac{\sqrt{2} \, |h| z_i}{\sigma^2}$$

where n is complex Gaussian noise with mean zero and variance $2\sigma^2$, $\Lambda(x^0)$ is the received log likelihood ratio of $x^0$, and $X^{k,j}$ is the set of symbols having the $k^{th}$ bit as 1. When $x^0=0$, $z_i$ has a Gaussian distribution with mean $|h|/\sqrt{2}$ and variance $\sigma^2$, and accordingly, the distribution of $\Lambda(x^0)$ has a mean value of $|h|^2/\sigma^2$ and a variance of $2|h|^2/\sigma^2$. Also, since the distribution of $\Lambda(x^j)$ is the same, the log likelihood ratio distribution of received bits is Gaussian with mean $|h|^2/\sigma^2$ and variance $2|h|^2/\sigma^2$. If assuming that channel values in a single code block are given as $h_l$ where $l=0, \ldots, L-1$, the mean and variance of the log likelihood ratio of the received bits in the code block are given in Equation 2.

$$E\{\Lambda(x^k) \mid x^k = 0\} = \frac{1}{L}\sum_{l=0}^{L-1} \frac{|h_l|^2}{\sigma^2} = 2m_{SNR}$$

$$E\{\Lambda^2(x^k) \mid x^k = 0\} = \frac{1}{L}\left(\sum_{l=0}^{L-1} \frac{2|h_l|^2}{\sigma^2} + \frac{|h_l|^4}{\sigma^4}\right)$$

$$\text{Var}\{\Lambda(x^k) \mid x^k = 0\} = E\{\Lambda^2(x^k) \mid x^k = 0\} -$$

$$E^2\{\Lambda(x^k) \mid x^k = 0\}$$

$$= \frac{1}{L}\left(\sum_{l=0}^{L-1} \frac{2|h_l|^2}{\sigma^2} + \frac{|h_l|^4}{\sigma^4}\right) -$$

$$\left(\frac{1}{L}\sum_{l=0}^{L-1} \frac{|h_l|^2}{\sigma^2}\right)^2$$

$$= 4m_{SNR} + 4\sigma_{SNR}^2$$

$$m_{SNR} = \frac{1}{L}\sum_{l=0}^{L-1} \frac{|h_l|^2}{2\sigma^2}$$

$$\sigma_{SNR}^2 = \frac{1}{L}\sum_{l=0}^{L-1}\left(\frac{|h_l|^2}{2\sigma^2}\right)^2 - \left(\frac{1}{L}\sum_{l=0}^{L-1} \frac{|h_l|^2}{2\sigma^2}\right)^2$$

Equation 2

Therefore, the mean value and the variance value of the received log likelihood ratio of the corresponding code block can be found through the mean and variance values of the received SNR of the respective symbols in the code block, and the distribution of the received log likelihood ratio can be found by applying the Gaussian approximation.

A generalized M-QAM will now be described. Since the M-QAM does not have constant Euclidean distances between symbols, the received log likelihood ratio can be different for each bit. Therefore, the distribution of the total received log likelihood ratios is given as an expectation of the received log likelihood ratio distributions of the respective bits. The approximated received log likelihood ratios are given as Equation 3.

$$\Lambda(x^0) = \log\left(\sum_{x \in X^{0,0}} Pr\{z \mid h|x\}Pr\{x\}\right) -$$

$$\log\left(\sum_{x \in X^{0,1}} Pr\{z \mid h|x\}Pr\{x\}\right)$$

$$\approx \log(\max_{x \in X^{0,0}} Pr\{z \mid h|x\}Pr\{x\}) -$$

$$\log(\max_{x \in X^{0,1}} Pr\{z \mid h|x\}Pr\{x\})$$

$$= \text{Euclidean distance difference}/\sigma^2$$

Equation 3

Since the Euclidean distance is proportional to $|h|^2$, the received log likelihood ratio is given as a value proportional to $|h|^2/\sigma^2$, and its mean and variance have the form of Equation 4.

$$E\{\Lambda(x^k)|x^k=0\} \propto m_{SNR}$$

$$\text{Var}\{\Lambda(x^k)|x^k=0\} \propto am_{SNR}+bm_{SNR}^2+c\sigma_{SNR}^2$$

Equation 4

Therefore, the distribution of the received log likelihood ratio is shown only by the mean value and the variance value of the SNR in the code block in the case of using the M-QAM as a modulation method.

Next, a case for applying $N_T$ antennas to the transmitter to use spatial-time or frequency block codes, and applying $N_R$ antennas to the receiver to use receive diversity, will now be described. When defining a complex gain $h_{a,b}$ of from the $a^{th}$ transmit antenna to the $b^{th}$ receive antenna, a definition variable z after a maximal ratio combining is given as Equation 5.

$$z = |h'|x + n''$$

$$|h'|^2 = \sum_{a=0}^{N_T-1}\sum_{b=0}^{N_R-1} |h_{a,b}|^2$$

Equation 5

Hence, in the case of using multiple antennas to use diversity, a combined channel gain $h_l'$ (l=0, ..., L−1) generated by previously combining channels of a plurality of antennas is used for each symbol in the code block to find the distribution of the received log likelihood ratio in the same manner of using a transmit antenna and a receive antenna respectively. Also, the transmitter can advantageously receive channel information irrespective of a number of antennas when the number of receive antennas of the respective receivers is different in the case of transmitting signals to multiple antennas from a single transmitter.

Lastly, a case of using $N_T$ antennas at the transmitter and $N_R$ ($\geq N_T$) antennas at the receiver to use spatial multiplexing will be described. In this case, M-QAM base signals are transmitted by using the respective transmit antennas, and all the transmit antennas use the same transmit power and the same modulation method. The transmit symbol and the receive symbol can be given in the vector format as shown in Equation 6.

$$y = Hx + n$$

$$= UDV^H x + n$$

$$H = UDV^H$$

Equation 6 where H is a matrix whose element at the $a^{th}$ row and at the $b^{th}$ column is $h_{a,b}$, and U and D are matrices obtained by performing singular value decomposition. Also, $\sqrt{\lambda_i}$ is the $i^{th}$ diagonal element of the matrix D, that is, the $i^{th}$ singular value of the matrix H. Then, the Euclidean distance is found by Equation 7.

$$\|y - Hx\|^2 = \|U(U^H y - DV^H x)\|^2$$

$$= \|y' - Dx'\|^2$$

$$= \sum_{a=0}^{N_T-1} \|y_a' - \sqrt{\lambda_a} x_a'\|^2$$

$$y' = Dx' + n'$$

$$y' = U^H y, x' = V^H x, n' = U^H n$$

Equation 7

Since U and V are unitary matrices, the distance $\|x_i-x_j\|^2$ between two different symbols in the original constellation corresponds to the distance $\|V^H x_i - V^H x_j\|^2$ between two different symbols transformed by the unitary matrix V. Also, the statistical property of n' corresponds to that of n. Therefore, the received log likelihood ratio in the case of using spatial multiplexing corresponds to the log likelihood ratio received through $N_T$ channels having the respective channel gains $\sqrt{\lambda_i}$. Hence, the distribution of the received log likelihood ratio is obtained by finding the mean and the standard deviation of the SNR of the $N_T$ channels for each symbol in the code block in the same manner of using a single transmit antenna.

Figure 5:
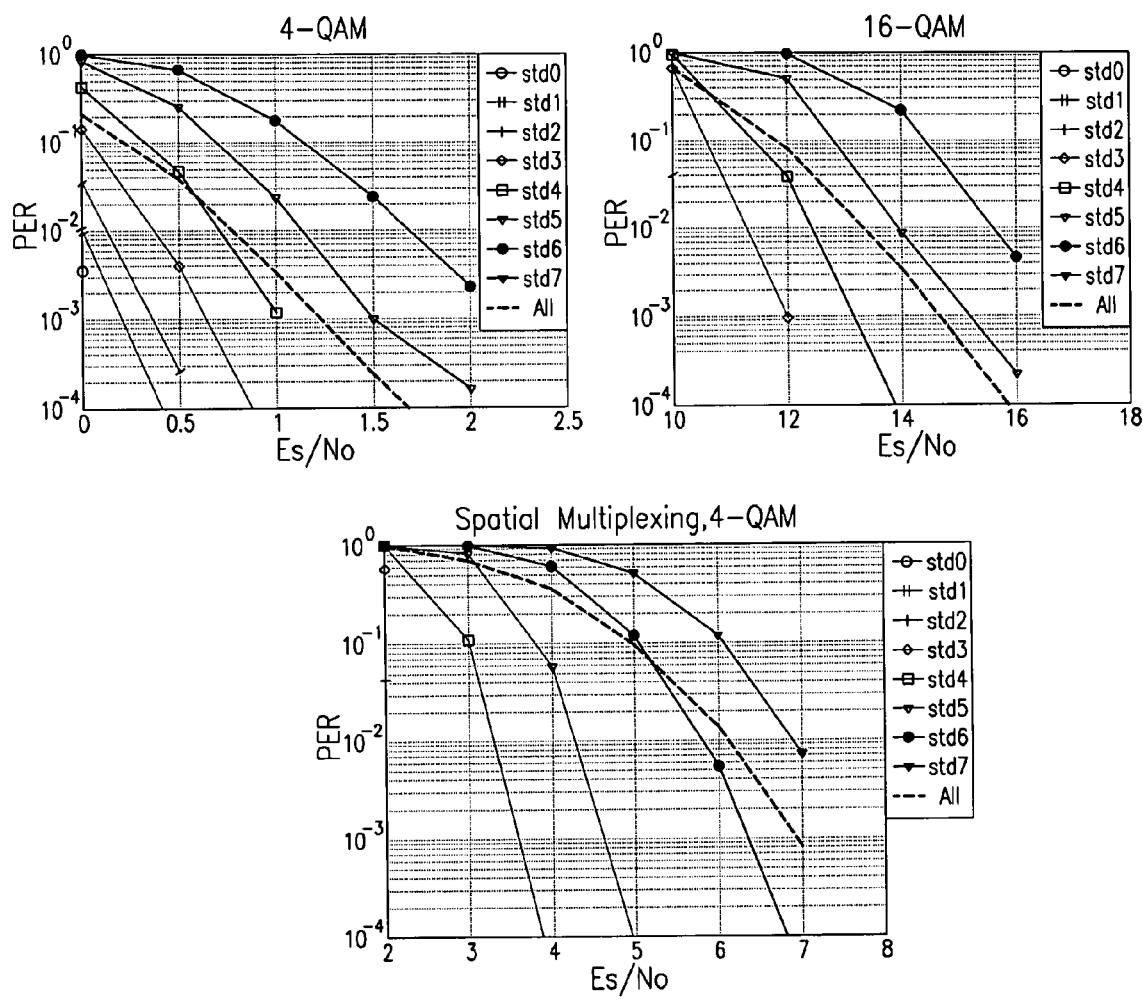
FIG. 5 shows graphs for representing performance according to normalized standard deviation values quantized by eight stages when performing compensation so as to keep the mean value of each distribution of the received log likelihood ratio constant when using the 4-QAM, 16-QAM, and 4-QAM spatial multiplexing according to a preferred embodiment of the present invention.

FIG. 5 shows graphs for representing performance according to normalized standard deviation values quantized by eight stages when performing compensation so as to obtain a constant mean value according to distribution of respective received log likelihood ratios when using the 4-QAM, 16-QAM, and 4-QAM spatial multiplexing according to a preferred embodiment of the present invention.

As shown, performance is degraded as the normalized standard deviation becomes greater when the means of the distributions of the received log likelihood ratios correspond to each other. The performance difference between the case (std0) of the least normalized standard deviation value and the case (all) of having neglected the normalized standard deviation value is substantially 0.8 dB in the case of 4-QAM, it is greater than 3 dB in the case of 16-QAM, and it is greater than 4 dB in the case of 4-QAM spatial multiplexing. Therefore, it is fairly accurate to predict the performance according to the distribution of the received log likelihood ratio, thereby reducing transmit power and improving performance compared to the case of only using the mean value of the SNR.

Figure 6:
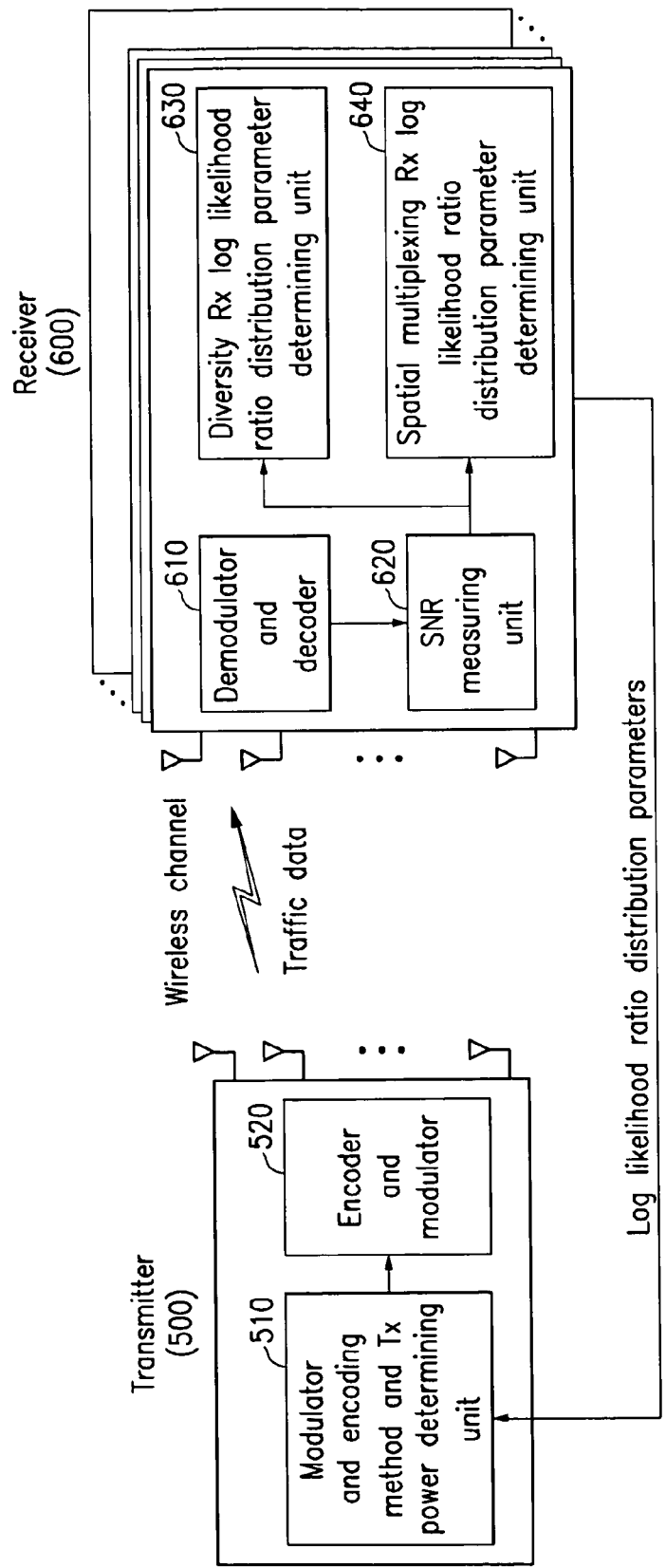
FIG. 6 shows a block diagram of an adaptive transmitting and receiving device in a wireless communication system using frequency division duplexing according to a preferred embodiment of the present invention.

FIG. 6 shows a block diagram of an adaptive transmitting and receiving device in a wireless communication system using frequency division duplexing according to a preferred embodiment of the present invention.

As shown, an adaptive transmitting and receiving device in the wireless communication system using frequency division duplexing comprises a transmitter 500 and a receiver 600.

The receiver 600 determines parameters for determining the distribution of the received log likelihood ratio based on the SNR estimated from the preamble or the pilot received from the transmitter 500, and feeds the parameters back to the transmitter 500.

The transmitter 500 adaptively transmits traffic data according to the antenna/modulation/encoding method determined by the log likelihood ratio distribution parameters fed back from the receiver 600 and the transmit power.

To achieve this, the transmitter 500 comprises a modulator and encoding method and transmit power determining unit 510, and an encoder and modulator 520.

Figure 7:
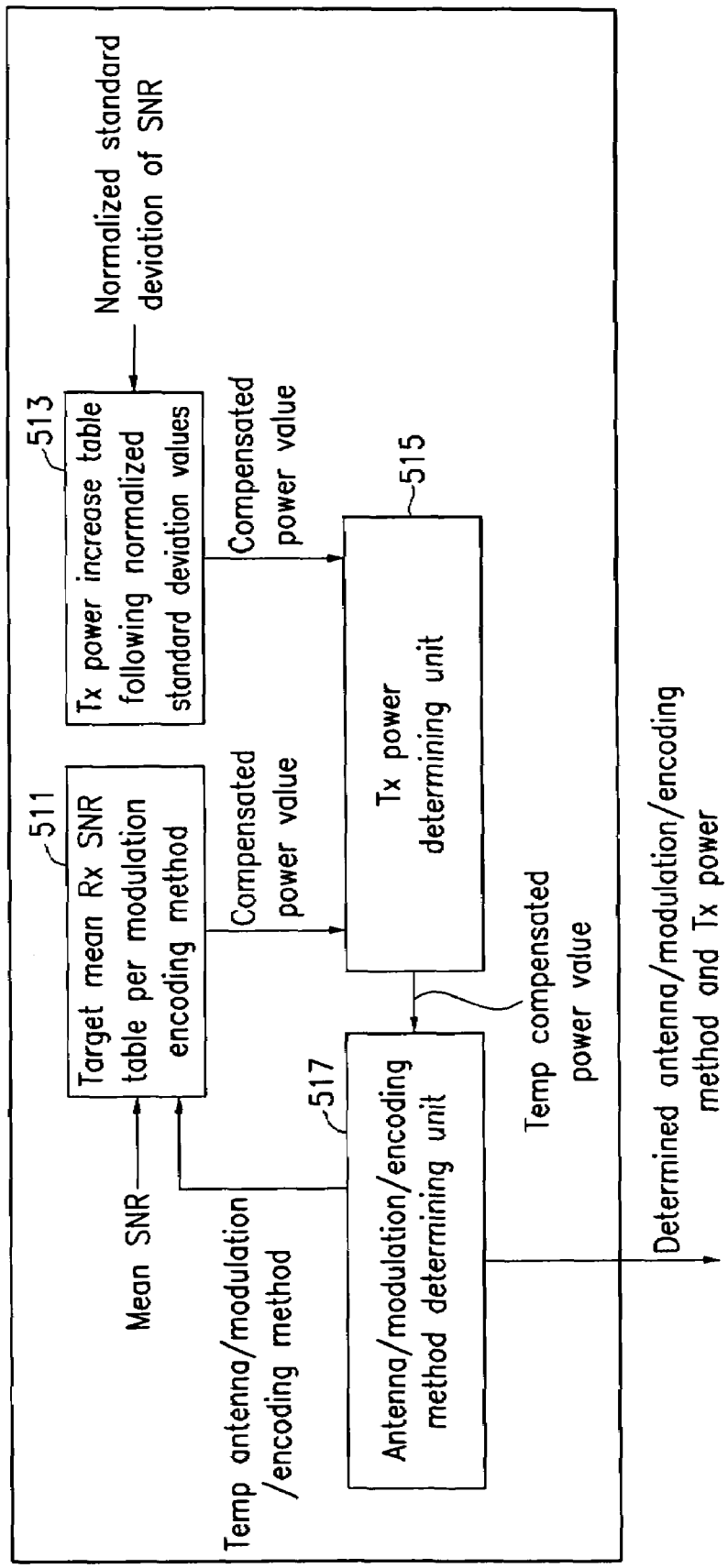
FIG. 7 shows a block diagram of a modulation/encoding method/transmit power determining unit in an adaptive transmitting device shown in FIG. 6.

Referring to FIG. 7, the modulator and encoding method and transmit power determining unit 510 comprises a per-modulation-encoding-method target mean received SNR table 511 for presetting compensated power values per modulation encoding method; a normalized-standard-deviation-values-following transmit power increase table 513 for establishing compensated power values corresponding to the log likelihood ratio distribution parameters fed back from the receiver 600; a transmit power determining unit 515 for adding the compensated power values output from the per-modulation-encoding-method target mean received SNR table 511 and the compensated power values output from the normalized-standard-deviation-values-following transmit power increase table 513 to determine the compensated power value for the corresponding antenna/modulation/encoding method; and an antenna/modulation/encoding method determining unit 517 for determining an antenna/modulation/encoding method corresponding to the compensated power value determined by the transmit power determining unit 515 and outputting the determined method to an encoder and modulator 520.

Referring again to FIG. 6, the receiver 600 comprises a demodulator and decoder 610 for demodulating and decoding the preamble, the pilot, and the traffic data transmitted by the transmitter 500; an SNR measuring unit 620 for estimating the SNR included in the demodulated preamble or the pilot in a single code block; a diversity received log likelihood ratio distribution parameter determining unit 630 for calculating a combined channel SNR from the SNR per transmit/receive antenna estimated by the SNR measuring unit 620, determining a diversity received log likelihood ratio distribution parameter, and outputting the parameter to the transmitter 500; and a spatial multiplexing received log likelihood ratio distribution parameter determining unit 640 for calculating a spatial channel SNR from the SNR per transmit/receive antenna estimated by the SNR measuring unit 620, determining a spatial multiplexing received log likelihood ratio distribution parameter, and outputting the parameter to the transmitter 500.

Figure 8:
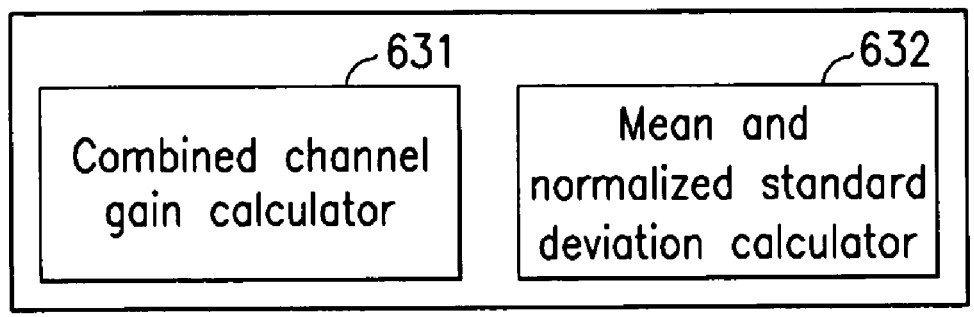
FIG. 8 shows a block diagram of a diversity received log likelihood ratio distribution parameter determining unit in an adaptive receiving device shown in FIG. 6.

Referring to FIG. 8, the diversity received log likelihood ratio distribution parameter determining unit 630 comprises: a combined channel gain calculator 631 for receiving a per-transmit/receive-antenna SNR for each symbol in a single code block from the SNR measuring unit 620, and calculating the combined channel gain $h_l'$ and the combined $$SNR \frac{|h_l'|^2}{2\sigma^2}$$

of the $l^{th}$ symbol in the code block as given in Equation 5; and a mean and normalized standard deviation calculator 632 for finding the mean and the normalized standard deviation of the combined SNR calculated by the combined channel gain calculator 631, and outputting them as diversity received log likelihood ratio distribution parameters.

Figure 9:
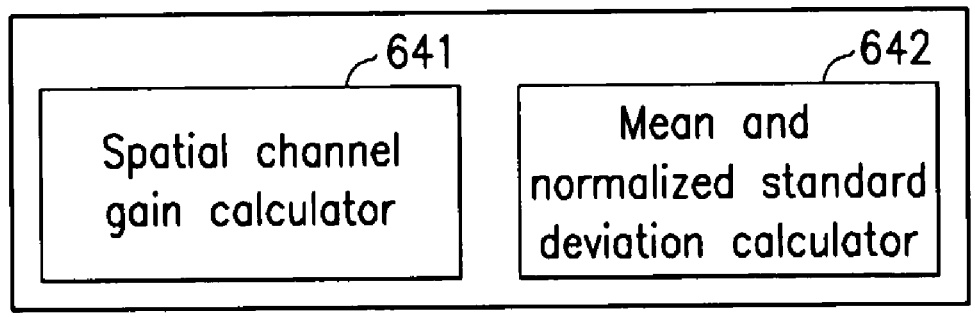
FIG. 9 shows a block diagram of a spatial multiplexing received log likelihood ratio distribution parameter determining unit in an adaptive receiving device shown in FIG. 6.

Referring to FIG. 9, the spatial multiplexing received log likelihood ratio distribution parameter determining unit 640 comprises a spatial channel gain calculator 641 for using the SNR measured by the SNR measuring unit 620 to calculate the channel gain matrix $H_l$ of the $l^{th}$ symbol in a single code block as given in Equation 6, and calculating singular values $\sqrt{\lambda_{i,l}}$, i=0, ..., $N_T$−1 of the matrix and the $$SNR \frac{\lambda_{i,l}}{2\sigma^2}$$

of the respective spatial channels; and a mean and normalized standard deviation calculator 642 for finding the mean and the normalized standard deviation of the SNR of all the spatial channels in the code block calculated by the spatial channel gain calculator 641, and outputting them as spatial multiplexing received log likelihood ratio distribution parameters.

In the case of a multiple access system with a plurality of users, it is needed to select part of a plurality of antennas according to a predefined algorithm. In this instance, the antenna/modulation/encoding method determining unit 517 of the transmitter 500 finds respective compensated power values of an available user combination and a modulation and encoding method combination through the per-modulation-encoding-method target mean received SNR table 511 and a transmit power increase table 512 for each user, adds them to calculate the required total transmit power, and selects a determined antenna/modulation/encoding method and transmit power 578 in consideration of the transmitted data requirements and QoS (quality of services).

Figure 10:
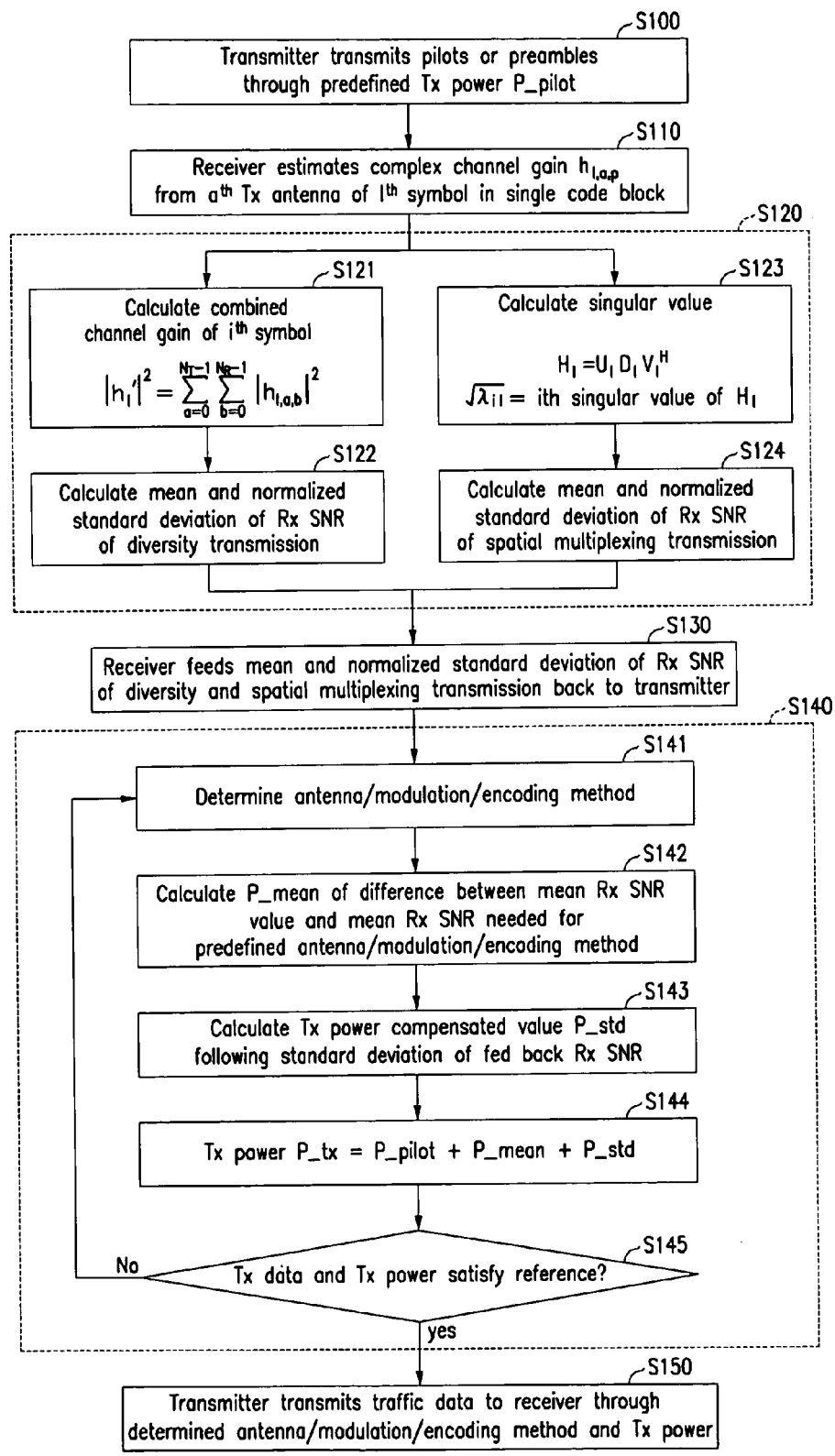
FIG. 10 shows a flowchart of an adaptive transmitting and receiving method in a wireless communication system using frequency division duplexing according to a preferred embodiment of the present invention.

Referring to FIG. 10, an adaptive transmitting and receiving method in a wireless communication system using frequency division duplexing will be described.

The transmitter 500 transmits a pilot or a preamble to the receiver 600 by using a predefined transmit power $P_{pilot}$ in step S100.

The receiver 600 calculates the mean and the normalized standard deviation of the received SNR, that is, parameters for determining the distribution of the received log likelihood ratio in step S120. In this instance, the parameters for determining the distribution of the received log likelihood ratio are determined for both diversity and spatial multiplexing or for one of them. The receiver 600 feeds the mean and the normalized standard deviation of the received SNR of the calculated diversity and spatial multiplexing transmission back to the transmitter 500 in step S130.

The transmitter 500 uses the mean and the normalized standard deviation of the received SNR of the diversity and spatial multiplexing transmission fed back from the receiver 600 to determine an antenna/modulation/encoding method in step S140, and adaptively transmits traffic data by using the antenna/modulation/encoding method determined in step S140 and the transmit power in step S150.

The above-described step S120 is executed in further detail as follows.

The combined channel gain calculator 631 of the diversity received log likelihood ratio distribution parameter determining unit 630 performs MRC (maximal ratio combining) on the channel gains of the respective transmit/receive antennas and calculates the combined channel gain in step S121 in order to predict the performance of diversity transmission.

The mean and normalized standard deviation calculator 632 finds in step S122 the mean and the normalized standard deviation of the combined SNR from the combined channel gain in a single code block calculated in the previous step S121.

The spatial channel gain calculator 641 of the spatial multiplexing received log likelihood ratio distribution parameter determining unit 640 finds singular values of the channel gain matrix including the channel gains of the respective transmit/receive antennas so as to predict the performance of spatial multiplexing in step S123.

The mean and normalized standard deviation calculator 642 finds in step S124 the mean and the normalized standard deviation of the SNR from the spatial channel gain in a single code block calculated in the previous step S123.

Also, the above-noted step S140 is executed in further detail through the subsequent process.

The modulator and encoding method and transmit power determining unit 510 of the transmitter 500 temporarily determines the antenna/modulation/encoding method in step S141.

The per-modulation-encoding-method target mean received SNR table 511 calculates in step S142 a compensated power value $P_{mean}$ which corresponds to a difference between the mean received SNR value and the necessary mean received SNR value predefined according to the antenna/modulation/encoding method determined in the previous step S141.

The transmit power increase table 512 following the normalized standard deviation calculates in step S143 a compensated power value $P_{std}$ which corresponds to the normalized standard deviation value of the received SNR fed back from the previous step S142.

The transmit power determining unit 515 calculates a necessary transmit power of the antenna/modulation/encoding method determined in the above step S141 through the equation of $P_{tx}=P_{pilot}+P_{mean}+P_{std}$ in step S144.

The transmit power determining unit 515 determines whether the amount of transmit data and the transmit power satisfy a predetermined reference, and when they do not satisfy it, the transmit power determining unit 515 repeats the steps S141, S142, S143, and S144 to select the antenna/modulation/encoding method which satisfies the reference in step S145.

The previous step S140 can be configured as follows in the case of the multiple access system with a plurality of users.

Available users and combinations of the respective antenna/modulation/encoding methods are determined.

The value $P_{mean}$ which corresponds to the difference between the mean received SNR value per user and the necessary mean received SNR value predefined by the determined antenna/modulation/encoding method of the corresponding user is calculated.

The compensated transmit power value $P_{std}$ which corresponds to the normalized standard deviation value of the received SNR per user fed back from the receiver 600 is calculated.

The necessary transmit power $P_{tx}=P_{pilot}+P_{mean}+P_{std}$ of the antenna/modulation/encoding method determined per user is calculated.

It is determined whether the amount of the transmit data of the selected users and the transmit power satisfy the reference, and when they fail to satisfy it, the above-noted process is repeated until other users or the combination of a different antenna/modulation/encoding which satisfy the reference method will be selected.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, adaptive transmission with a lesser amount of information can be effectively performed by feeding back information which determines the distribution of the received log likelihood ratio in the environment of using at least one transmit antenna and at least one receive antenna.

Also, receiving performance is controlled to be well predicted with a lesser amount of feedback information, and the optimal antenna/modulation/encoding method and a corresponding transmit power are found in the multiple carrier using system to allow adaptive transmission, thereby enhancing performance of the wireless communication system.

Further, performance of diversity transmission and performance of spatial multiplexing are respectively predicted in the system which uses both methods, the two methods are adaptively used, and hence, performance of the wireless communication system is improved.

What is claimed is:

1. An adaptive transmitter in a wireless communication system using frequency division duplexing, comprising:

a modulation and encoding method and transmit power determining unit for determining an antenna method, a modulation and encoding method, and a corresponding transmit power according to parameters (received log likelihood ratio parameters) fed back from a receiver, the parameters including a mean and a normalized standard deviation of SNRs (Signal to Noise Ratios) calculated by the receiver; and an encoder and modulator for adaptively transmitting the traffic data to the receiver according to the antenna method, the modulation and encoding method, and the transmit power determined by the modulation and encoding method and transmit power determining unit, wherein the transmit power is equal to a sum of a first compensated power value Pmean, a second compensated power value Pstd, and a pre-determined transmit power, wherein Pmean corresponds to a difference between the mean of the SNRs and a predefined mean SNR for the determined antenna method, the modulation and the encoding method, Pstd corresponds to the normalized standard deviation of the SNRs, and the pre-determined transmit power is used to transmit a pilot or a preamble to the receiver.

2. The adaptive transmitter of claim 1, wherein the modulation and encoding method and transmit power determining unit comprises:
- a per-modulation-encoding-method target mean received SNR (signal to noise ratio) table for predefining target mean received SNR per modulation encoding method;
- a transmit power increase table for establishing per-modulation-encoding-method compensated power values that correspond to the received log likelihood ratio parameters fed back from the receiver;
- a transmit power determining unit for using the compensated power value output from the per-modulation-encoding-method target mean received SNR table and the compensated power value output from the transmit power increase table according to the received log likelihood ratio parameters and determining compensated power values of the corresponding antenna method, the modulation method, and the encoding method; and
- an antenna/modulation/encoding method determining unit for determining the antenna method and the modulation and encoding method corresponding to the compensated power values determined by the transmit power determining unit, and outputting them to the encoder and modulator.

3. The adaptive transmitter of claim 1, wherein the received log likelihood ratio parameters include the mean and the normalized standard deviation of the SNRs calculated by the receiver from at least one of a combined channel gain or a spatial channel gain.

4. The adaptive transmitter of claim 1, wherein the modulation and encoding method and transmit power determining unit comprises:
- a per-modulation-encoding-method target mean received SNR table for presetting target mean SNR per modulation encoding method;
- a transmit power increase table for setting per-modulation-encoding-method compensated power values corresponding to the normalized standard deviation of the SNRs fed back from the receiver;
- a transmit power determining unit for using the target power output from the per-modulation-encoding-method target mean received SNR table, the compensated power value according to the mean of the SNRs fed back from the receiver, and the compensated power value output by the transmit power increase table according to the normalized standard deviation of the fed-back SNRs, and determining the compensated power values on the corresponding antenna method and the modulation and encoding method; and
- an antenna/modulation/encoding method determining unit for determining the antenna method and the modulation and encoding method which correspond to the compensated power values determined by the transmit power determining unit, and outputting them to the encoder and modulator.

5. The adaptive transmitter of claim 3, wherein the received log likelihood ratio parameters include the mean and the normalized standard deviation of combined SNRs calculated by the receiver in the case of using diversity transmission,
- the parameters include the mean and the normalized standard deviation of spatial channel SNRs calculated by the receiver in the case of using spatial multiplexing transmission, and
- the parameters include the mean and the normalized standard deviation of the combined SNRs calculated by the receiver, and the mean and the normalized standard deviation of the spatial channel SNRs calculated by the receiver in the case of using both diversity transmission and spatial multiplexing transmission.

6. An adaptive receiver in a wireless communication system using frequency division duplexing, comprising:
- a demodulator and decoder for receiving signals from a transmitter, and demodulating and decoding the signals;
- an SNR (signal to noise ratio) measuring unit for estimating channel gains or SNRs in a single code block through preambles or pilots output by the demodulator and decoder; and
- a received log likelihood ratio parameter determining unit for finding parameters from the channel gains or the SNRs estimated by the SNR measuring unit, and feeding the parameters back for adaptive transmission of the transmitter, the parameters including a mean and a normalized standard deviation of the SNRs in the single code block,
wherein the receiver is to cause the transmitter to adjust transmit power to be equal to a sum of a first compensated power value Pmean, a second compensated power value Pstd, and a pre-determined transmit power, wherein Pmean corresponds to a difference between the mean of the SNRs and a predefined mean SNR for a determined antenna method, a modulation and a encoding method, Pstd corresponds to the normalized standard deviation of the SNRs, and the pre-determined transmit power is used to transmit the pilots or preambles.

7. The adaptive receiver of claim 6, wherein the received log likelihood ratio parameter determining unit comprises:
- a diversity received log likelihood ratio parameter determining unit for calculating combined SNRs from the channel gains or the SNRs estimated by the SNR measuring unit, determining diversity received log likelihood ratio parameters, and outputting the parameters to the transmitter; and
- a spatial multiplexing received log likelihood ratio parameter determining unit for calculating SNRs of spatial channels from the channel gains or the SNRs estimated by the SNR measuring unit, determining spatial multiplexing received log likelihood ratio parameters, and outputting the parameters to the transmitter.

8. The adaptive receiver of claim 7, wherein the diversity received log likelihood ratio parameter determining unit comprises:
- a combined channel gain calculator for receiving per-transmit/receive-antenna channel gain or SNR for each symbol in a single code block from the SNR measuring unit, and finding a combined channel gain and a combined SNR of each symbol in the code block; and
- a mean and normalized standard deviation calculator for finding the mean and the normalized standard deviation of the combined SNRs in the single code block obtained from the combined channel gain calculator, setting them as the diversity received log likelihood ratio parameters, and feeding the parameters back to the transmitter.

9. The adaptive receiver of claim 7, wherein the spatial multiplexing received log likelihood ratio parameter determining unit comprises:
- a spatial channel gain calculator for receiving a channel gain matrix of each symbol in the single code block from the SNR measuring unit, and finding singular values of the matrix or the SNR of the respective spatial channels; and
- a mean and normalized standard deviation calculator for finding the mean and the normalized standard deviation of the spatial channel gain or the spatial channel SNR in the single code block found from the spatial channel gain calculator, setting them as the spatial multiplexing received log likelihood ratio parameters, and feeding the parameters back to the transmitter.

10. An adaptive transmitting method of a wireless communication system using frequency division duplexing, comprising:
- (a) transmitting a pilot or a preamble to a receiver by using a predefined transmit power;
- (b) determining an antenna method, a modulation and encoding method, and a transmit power based on the parameters (received log likelihood ratio parameters) fed back from a receiver, the parameters including a mean and a normalized standard deviation of SNRs (Signal to Noise Ratios) calculated by the receiver, wherein the transmit power is equal to a sum of a first compensated power value Pmean, a second compensated power value Pstd, and a pre-determined transmit power, wherein Pmean corresponds to a difference between the mean of the SNRs and a predefined mean SNR for the determined antenna method, the modulation and the encoding method, Pstd corresponds to the normalized standard deviation of the SNRs and the pre-determined transmit power is used to transmit the pilot or the preamble; and
- (c) transmitting traffic data to the receiver by using the determined antenna method, the modulation and encoding method, and the transmit power.

11. The adaptive transmitting method of claim 10, wherein (b) comprises presetting and storing the performance of all the antenna/modulation/encoding methods used by an adaptive transmitter with respect to the pre-determined quantized values of the received log likelihood ratio parameters, and calculating transmit power needed for obtaining target performance on each antenna/modulation/encoding method from the received log likelihood ratio parameters fed back from the receiver.

12. The adaptive transmitting method of claim 10, wherein (b) comprises finding a transmit power needed for further compensating for the mean of received SNR for achieving target performance on the predefined antenna methods and the modulation and encoding methods, and a compensated transmit power for achieving target performance on the predefined antenna methods and the modulation and encoding methods from the received log likelihood ratio parameters fed back from the receiver.

13. The adaptive transmitting method of claim 10, wherein (b) comprises:
- compensating for a difference between the mean of received SNR for achieving target performance on the predefined antenna methods and the modulation and encoding methods and the mean of the received SNR fed back from the receiver; and
- finding a transmit power so as to compensate for a compensated transmit power further needed for achieving target performance on the predefined antenna methods and the modulation and encoding methods from the normalized standard deviation of the SNRs fed back from the receiver.

14. An adaptive receiving method of a wireless communication system using frequency division duplexing, comprising:
- (a) estimating a complex channel gain (the complex channel gain being from a transmit antenna to a receive antenna) of each symbol in a single code block through a pilot or a preamble transmitted from a transmitter;
- (b) calculating parameters (received log likelihood ratio parameters) including a mean and a normalized standard deviation of SNRs (Signal to Noise Ratios) from the estimated complex channel gain (from a transmit antenna to a receive antenna) of each symbol in a single code block; and
- (c) feeding the calculated received log likelihood ratio parameters to the transmitter to cause the transmitter to adjust transmit power to be equal to a sum of a first compensated power value Pmean, a second compensated power value Pstd, and a pre-determined transmit power, wherein Pmean corresponds to a difference between the mean of the SNRs and a predefined mean SNR for a determined antenna method, a modulation and a encoding method, Pstd corresponds to the normalized standard deviation of the SNRs, and the pre-determined transmit power is used to transmit the pilot or the preamble.

* * * * *